United States Patent
Lee et al.

(10) Patent No.: US 12,052,413 B2
(45) Date of Patent: Jul. 30, 2024

(54) IMAGE SENSOR, IMAGE SENSOR TEST SYSTEM AND METHOD

(71) Applicant: SK hynix Inc., Icheon-si (KR)

(72) Inventors: Eun Khwang Lee, Icheon-si (KR); Dong Guk Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 90 days.

(21) Appl. No.: 17/350,322

(22) Filed: Jun. 17, 2021

(65) Prior Publication Data

US 2022/0210398 A1 Jun. 30, 2022

(30) Foreign Application Priority Data

Dec. 30, 2020 (KR) .................. 10-2020-0187263

(51) Int. Cl.
| H04N 17/00 | (2006.01) |
| G01K 13/00 | (2021.01) |
| H04N 25/63 | (2023.01) |
| H04N 25/633 | (2023.01) |

(52) U.S. Cl.
CPC .......... *H04N 17/002* (2013.01); *G01K 13/00* (2013.01); *H04N 25/63* (2023.01); *H04N 25/633* (2023.01)

(58) Field of Classification Search
CPC ........ H04N 17/002; H04N 5/335–379; H04N 5/23206–23209; H04N 25/63; H04N 25/633; H04N 17/00; H04N 25/75; H04N 25/77; H04N 25/772; H04N 25/11; G01K 13/00; G01K 1/026; G01K 7/01; H01L 27/14621; H01L 27/14627
See application file for complete search history.

(56) References Cited

U.S. PATENT DOCUMENTS

| 8,441,561 B2 | 5/2013 | Okado | |
| 2008/0157141 A1* | 7/2008 | Han | H01L 27/14645 257/E27.008 |
| 2008/0157247 A1* | 7/2008 | Yun | H01L 27/14621 257/E31.127 |
| 2011/0199519 A1* | 8/2011 | Yamauchi | H04N 5/361 348/244 |
| 2011/0279727 A1* | 11/2011 | Kusaka | H01L 27/14627 348/340 |
| 2012/0075478 A1 | 3/2012 | Ahn | |

(Continued)

FOREIGN PATENT DOCUMENTS

| KR | 20120002786 A | 1/2012 |
| KR | 20160112431 A | 9/2016 |

(Continued)

*Primary Examiner* — John W Miller
*Assistant Examiner* — Humam M Satti
(74) *Attorney, Agent, or Firm* — Perkins Coie LLP

(57) ABSTRACT

Image sensors and image sensor test systems and methods are disclosed. In some implementations, an image sensor may include an active pixel array including a plurality of active pixels operable to convert incident light into pixel signals carrying image information in the incident light, a plurality of sample pixel groups located adjacent to but spatially separate from the active pixel array, and having different heat dissipation characteristics from other sample pixel groups, and a plurality of temperature sensors coupled to the sample pixel groups, respectively, to provide temperature measurements.

16 Claims, 9 Drawing Sheets

(56) References Cited

U.S. PATENT DOCUMENTS

| | | | | |
|---|---|---|---|---|
| 2016/0172401 A1* | 6/2016 | Kawasaki | ............... | H04N 23/57 |
| | | | | 348/241 |
| 2018/0069037 A1* | 3/2018 | Yang | ................... | H01L 27/1463 |
| 2019/0191120 A1* | 6/2019 | Ikedo | ........................ | G01J 1/44 |
| 2020/0137334 A1* | 4/2020 | Hu | ........................ | H04N 5/365 |

FOREIGN PATENT DOCUMENTS

| | | |
|---|---|---|
| KR | 20160125099 A | 10/2016 |
| KR | 20200002304 A | 1/2020 |

* cited by examiner

IMAGE SENSOR, IMAGE SENSOR TEST SYSTEM AND METHOD

CROSS-REFERENCES TO RELATED APPLICATION

This patent document claims the priority and benefits of Korean application number 10-2020-0187263, filed on Dec. 30, 2020, which is incorporated herein by reference in its entirety.

TECHNICAL FIELD

The technology and implementations disclosed in this patent document generally relate to a semiconductor integrated device, more particularly, to an image sensor, and an image sensor test system and method.

BACKGROUND

Image sensors include a pixel array that includes photoelectric semiconductor devices and transistors. The photoelectric semiconductor devices may convert light into photocharge. The transistors may convert the photo-charge generated by the photoelectric semiconductor device into an electrical signal.

CMOS image sensor may include a single integrated circuit (IC) in which an analog control circuit and a digital control circuit are integrated. CMOS image sensor may convert light rays reflected from an object and incident on the photoelectric semiconductor devices of the pixel array into electric charge. The quantity of electric charge accumulated is proportional to a voltage signal generated by the CMOS image sensor.

The electrical signal generated by the pixel array in the image sensor may include noise that can adversely affect the quality of images.

Examples of the noise includes a dark current, which is the relatively small electric current that flows through photosensitive devices such as a photodiode even when no photons are entering the device, causing distortion of the image signal. Thus, technologies for removing the noises are being studied.

SUMMARY

The technology disclosed in this patent document can be implemented in various embodiments to provide an image sensor that includes an active pixel array including a plurality of active pixels operable to convert incident light into pixel signals carrying image information in the incident light; a plurality of sample pixel groups located adjacent to but spatially separate from the active pixel array, and having different heat dissipation characteristics from other sample pixel groups; and a plurality of temperature sensors coupled to the sample pixel groups, respectively, to provide temperature measurements.

In example embodiments of the disclosed technology, an image sensor test system may include an image sensor including a plurality of sample pixel groups having different heat dissipation characteristics from other sample pixel groups, and a plurality of temperature sensors coupled to the sample pixel groups, respectively, to generate temperature detection signals; a temperature detector configured to receive the temperature detection signals corresponding to the sample pixel groups, respectively, from the temperature sensors to determine operating temperature information associated with the sample pixel groups; and a test apparatus configured to receive dark currents from the sample pixel groups to determine correction data to be used to correct the dark currents, the correction data including a dark level correction value for each temperature range and a pedestal correction coefficient.

In example embodiments of the disclosed technology, an image sensor test method comprising providing an image sensor including a plurality of sample pixel groups having different heat dissipation characteristics, and a plurality of temperature sensor coupled to the sample pixel groups, respectively; providing a test apparatus to receive operating temperature information including temperatures in the sample pixel groups in a test apparatus; receiving dark currents from the sample pixel groups; and determining correction data to be used to correct the dark currents, wherein the correction data includes a dark level correction value for each temperature range and a pedestal correction coefficient.

In example embodiments of the disclosed technology, an image sensor may include an active pixel array including a plurality of active pixels operable to convert incident light into pixel signals carrying image information in the incident light, a plurality of sample pixel groups located adjacent to but spatially separate from the active pixel array, each sample pixel group including image sensor pixels, and at least one of the sample pixel groups having different heat dissipation characteristics from other sample pixel groups, and a plurality of temperature sensors coupled to the sample pixel groups, respectively, to provide temperature measurements, wherein the sample pixel groups and the temperature sensors enable testing of the image sensor.

In example embodiments of the disclosed technology, an image sensor test system may include an image sensor including a plurality of sample pixel groups, each sample pixel group including image sensor pixels, at least one of the sample pixel groups having different heat dissipation characteristics from other sample pixel groups, and a plurality of temperature sensors coupled to the sample pixel groups, respectively, to generate temperature detection signals, a temperature detector configured to receive the temperature detection signals corresponding to the sample pixel groups, respectively, from the temperature sensors to determine operating temperature information associated with the sample pixel groups, and a test apparatus configured to receive dark currents from the sample pixel groups to determine correction data to be used to correct the dark currents, the correction data including a dark level correction value for each temperature range and a pedestal correction coefficient.

In example embodiments of the disclosed technology, an image sensor test method may include providing an image sensor including a plurality of sample pixel groups having different heat dissipation characteristics, and a plurality of temperature sensor coupled to the sample pixel groups, respectively, providing a test apparatus to receive operating temperature information including temperatures in the sample pixel groups in a test apparatus, receiving dark currents from the sample pixel groups, and determining correction data to be used to correct the dark currents, wherein the correction data includes a dark level correction value for each temperature range and a pedestal correction coefficient.

The technology disclosed in this patent document can be implemented in various embodiments to provide an image sensor that includes a plurality of sample pixel groups and a plurality of temperature sensors. The sample pixel groups may have different heat dissipation characteristics. The temperature sensors may be electrically coupled to the sample pixel groups, respectively.

In example embodiments of the disclosed technology, an image sensor test system may include an image sensor, a temperature detector and a test apparatus. The image sensor may include a plurality of sample pixel groups and a plurality of temperature sensors. The sample pixel groups may have different heat dissipation characteristics. The temperature sensors may be electrically coupled to the sample pixel groups, respectively. The temperature detector may receive temperatures of the sample pixel groups sensed by the temperature sensor to determine operational temperatures of the sample pixel groups. The test apparatus may receive dark currents from the sample pixel groups to deduce correction data including dark level correction values of by the operational temperatures and pedestal correction coefficients.

In example embodiments of the disclosed technology, an image sensor test method may use an image sensor. The image sensor may include a plurality of sample pixel groups and a plurality of temperature sensors. The sample pixel groups may have different heat dissipation characteristics. The temperature sensors may be electrically coupled to the sample pixel groups, respectively. A test apparatus may receive operational temperatures of the sample pixel groups. The test apparatus may receive dark currents from the sample pixel groups. The test apparatus may deduce correction data including dark level correction values of by the operational temperatures and pedestal correction coefficients

DETAILED DESCRIPTION

Features of the technology disclosed in this patent document are described by examples of an image sensing device with reference to the accompanying drawings.

Although a few embodiments of the disclosed technology will be discussed, the disclosed technology can be implemented in various ways beyond the specifics of the examples described herein.

Figure 1:
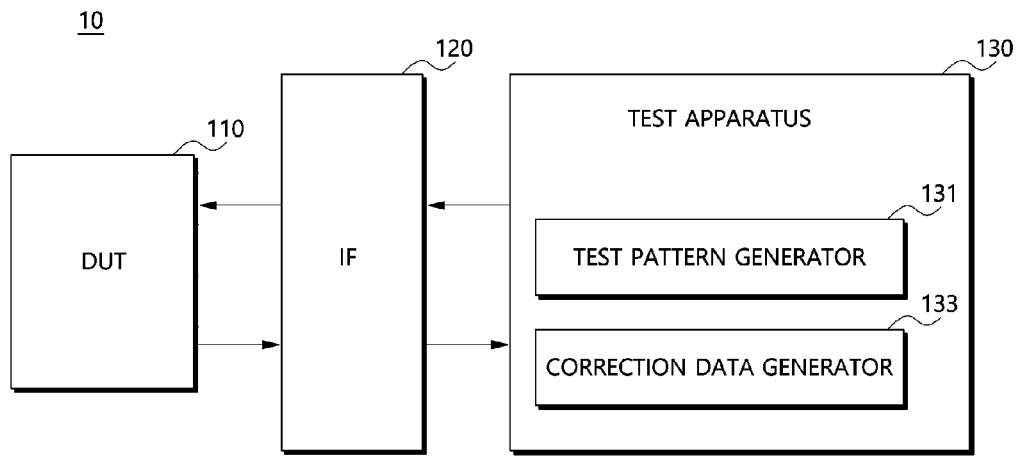
FIG. 1 illustrates an image sensor test system based on example embodiments of the disclosed technology.

FIG. 1 illustrates an image sensor test system based on example embodiments of the disclosed technology.

Referring to FIG. 1, an image sensor test system 10 may include a device under test (DUT) 110, a test apparatus 130 coupled to the DUT 110 to perform testing on the DUT 110, and an interface circuit (IF) 120 coupled between the DUT 110 and the test apparatus 130 as an electrical interface transmit signals between the DUT 110 and the test apparatus 130.

Figure 2A:
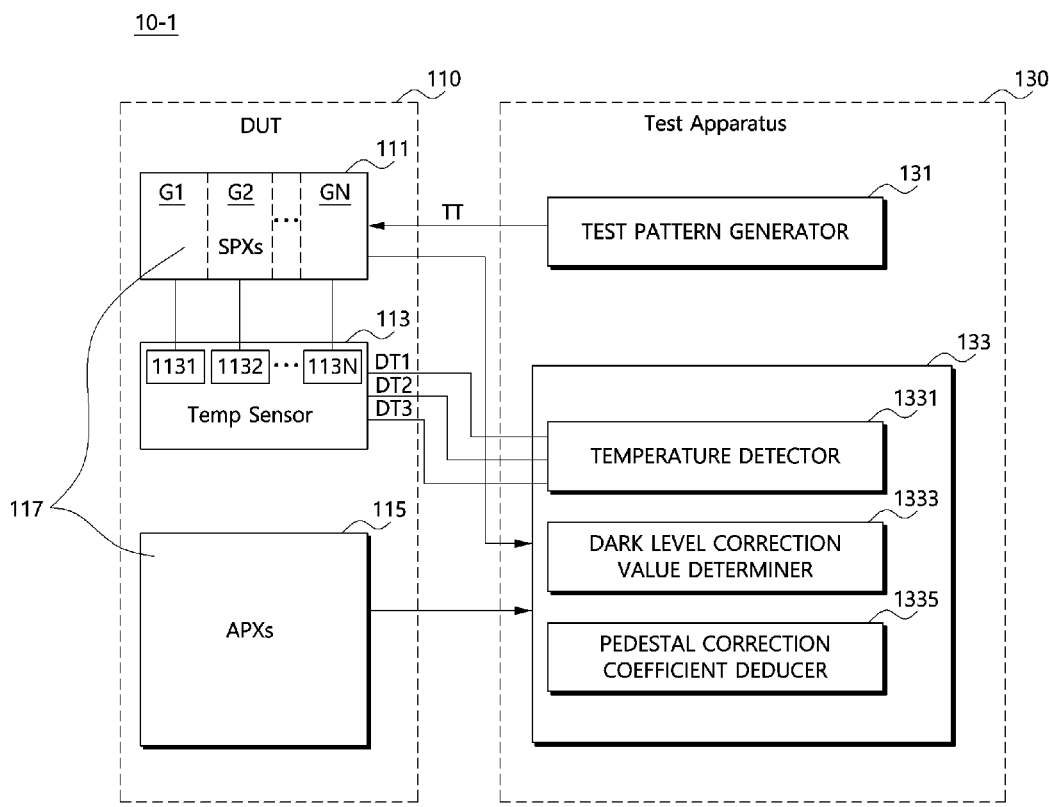
FIGS. 2A and 2B illustrate an image sensor test system based on example embodiments of the disclosed technology.

The DUT 110 may include at least one image sensor to be tested. In some implementations, the DUT 110 may include different image sensors while in other implementations, the DUT 110 may include one image sensor. Referring to FIG. 2A, an image sensor as the DUT 110 or part of the DUT 110 may include an active pixel array 115 of active pixels (APXs) for capturing incident light and producing pixel signals carrying images in the incident light, a plurality of sample pixel groups, a plurality of temperature sensors and. In some implementations, the active pixel array may include image sensing pixels that convert incident light into pixel signals. The disclosed technology can be implemented in some embodiments to provide an image sensor that includes multiple image sensor pixels or multiple image sensor pixel groups with different characteristics, enabling efficient testing of image sensors. In some implementations, characteristics of the image sensor pixels or image sensor pixel groups may include heat dissipation characteristics. In one example, at least one of the sample pixel groups may have different heat dissipation characteristics from other sample pixel groups. In another example, the sample pixel groups have different heat dissipation characteristics from each other. The temperature sensors may be coupled to each of the sample pixel groups, respectively.

The test system 10 may evaluate characteristics of the image sensor 110 after a wafer level process. Further, the test system 10 may then generate correction data based on the evaluated characteristics. In some implementations, the correction data may include information needed to correct or alter the designs, structures, fabrication processes of the DUT 110.

The interface circuit 120 may be electrically connected between the image sensor 110 and the test apparatus 130.

The test apparatus 130 may include a test pattern generator 131 and a correction data generator 133. In some implementations, the test pattern may include data input patterns or test signals that are used to test semiconductor devices after manufacture, or to assist with determining the cause of failure.

The test pattern generator 131 may transmit a test signal to the image sensor 110 through the interface circuit 120. The correction data generator 133 may receive a test response signal of the image sensor 110 corresponding to test signal. The correction data generator 133 may evaluate the characteristics of the image sensor 110 based on the test response signal. The correction data generator 133 may generate the correction data based on the evaluated characteristics.

In some example embodiments of the disclosed technology, the test pattern generator 131 may transmit a single temperature signal as the test signal to the image sensor 110. The correction data generator 133 may receive the test response signal including a temperature detection signal, an optical black signal and an active black signal to extract the correction data based on the temperatures. In some implementations, the correction data generator 133 may receive the temperature detection signal, the optical black signal and the active black signal on a sample pixel group basis to extract the correction data on a sample pixel group basis. In some implementations, the active black signal may include a pixel signal that is generated by an optically black active pixel. The correction data may include a dark level correction value for correcting or removing a dark level of the active pixel array, and a pedestal correction coefficient for preventing a clipping of the image signal. In some implementations, the dark level correction value can be used to remove noises associated with the dark current.

FIG. 2A illustrates an image sensor test system based on example embodiments of the disclosed technology.

Referring to FIG. 2A, an image sensor test system 10-1 may include an image sensor 110 corresponding to the DUT and a test apparatus 130 coupled to the image sensor 110. The test apparatus 130 may include a test pattern generator 131 and a correction data generator 133.

As shown in FIG. 2A, an interface circuit 120 on a circuit board (not shown) of the test apparatus 130 may be omitted.

The image sensor 110 may include a pixel array 117 and a temperature sensor 113. The pixel array 117 may include a sample pixel array 111 and an active pixel array 115. The temperature sensor 113 may be coupled to the sample pixel array 111. The pixel array 117 and the temperature sensor 113 will be discussed below with reference to FIGS. 3 to 5.

Figure 2B:
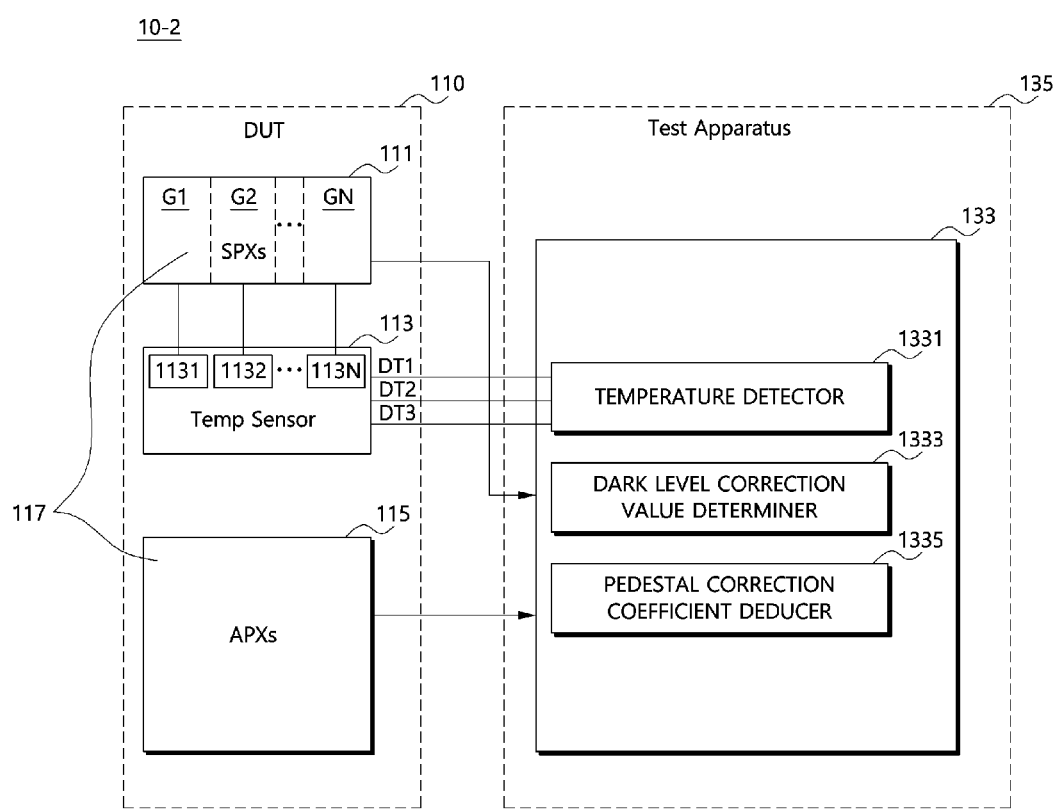

FIG. 2B illustrates an image sensor test system based on example embodiments of the disclosed technology.

Referring to FIG. 2B, an image sensor test system 10-2 may include a package type module that include an image sensor 110 and a test apparatus 135 formed of a chip on board (CoB) or a plastic leaded chip carrier (PLCC).

The test apparatus 135 may include a correction data generator 133.

The module type image sensor test system 10-2 may be mounted on an image sensing device. An operating temperature of the image sensor 110 in FIG. 2B may be determined based on an external temperature when the image sensor is exposed to the outside and an operation status of an ISP in the sensing device. The test apparatus 135 may detect a temperature of the device under test based on the operating temperature of the image sensor 110 to determine the dark level correction value and the pedestal correction coefficient.

In some example embodiments of the disclosed technology, a temperature detector 1331 may form a module together with the image sensor 110. That is, the temperature detector 1331 may be packaged with the image sensor 110. A dark level correction value determining circuit 1333 and a pedestal correction coefficient determining circuit 1335 may be mounted on the ISP.

Figure 3:
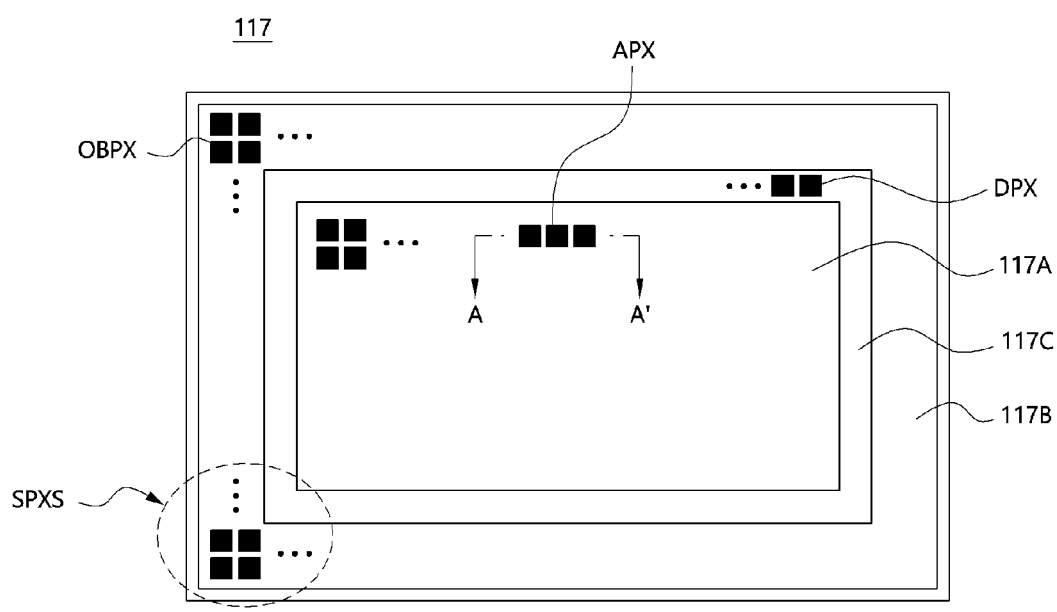
FIG. 3 illustrates a pixel array of an image sensor based on example embodiments of the disclosed technology.

FIG. 3 illustrates a pixel array of an image sensor based on example embodiments of the disclosed technology.

Referring to FIG. 3, the pixel array 117 of the image sensor 110 may include an active region 117A, an optical black region 117B and a dummy region 117C.

An active pixel array including a plurality of active pixels APXs may be formed in the active region 117A. The active pixels APX may correspond to image sensor pixels that are structured to respond to incident light and generate active signals carrying image information in the incident light.

The optical black region 117B may be positioned outside the active region 117A. In some implementations, the optical black region 117B may be arranged to surround the active region 117A. The optical black region 117B may include an array of optical black pixels OBPX. The optical black pixels OBPX can be used to compensate for dark current. The optical black pixel OBPX may maintain a "black" level by blocking light using a metal blocking layer and a black filter. The optical black pixel OBPX may generate an optical black signal.

The pixel array 117 may further include an additional pixel array region such as the dummy region 117C. As shown in FIG. 3, in some implementations, the dummy region 117C may be positioned between the active region 117A and the optical black region 117B. The dummy region 117C may include a plurality of dummy pixels DPX used to block electric charge from flowing into the optical block pixel OBPX of the optical black region 117B from the active pixel array 117A.

A plurality of sample pixels SPXs may be formed in at least one of the optical black region 117B and the dummy region 117c.

In some example embodiments of the disclosed technology, as shown in FIGS. 2A and 2B, a sample pixel array 111 may include a plurality of the sample pixel groups G1, G2, . . . , GN. At least one of the sample pixel groups G1, G2, . . . , GN may include a sample light block pixel. Further, at least one of the sample pixel groups G1, G2, . . . , GN may include a sample active pixel. The sample pixel groups G1, G2, . . . , GN may be arranged in the optical black region 117B and/or the dummy region 117C shown in FIG. 3.

Figure 4:
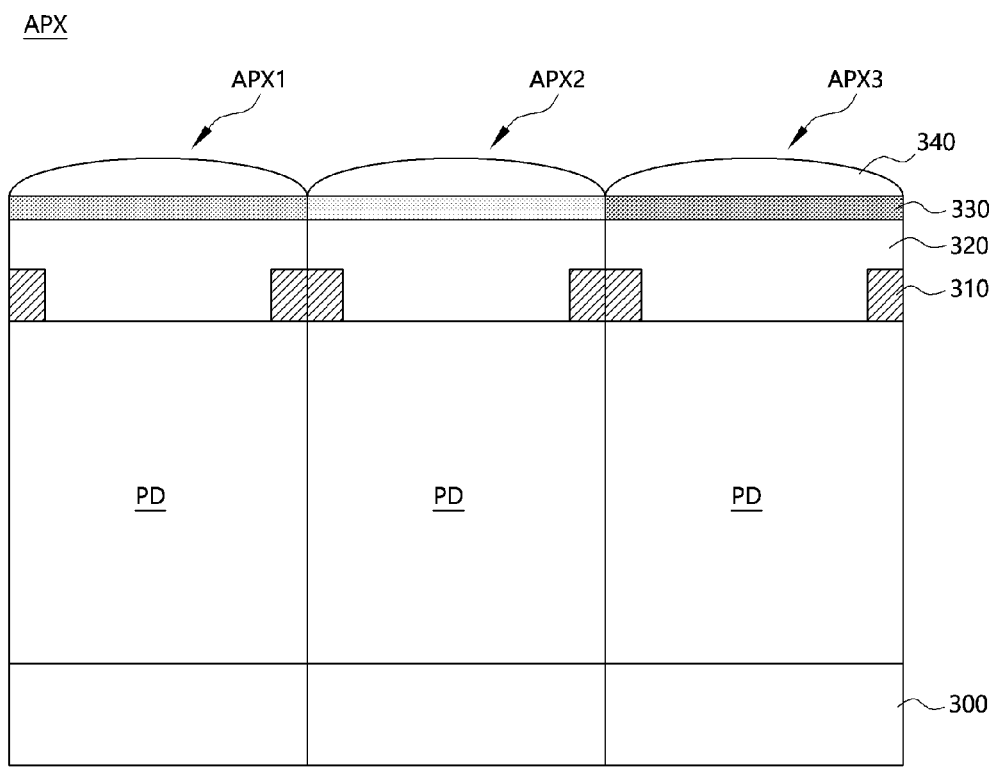
FIG. 4 illustrates an active pixel based on example embodiments of the disclosed technology.

FIG. 4 illustrates an active pixel based on example embodiments of the disclosed technology. Specifically, FIG. 4 is a cross-sectional view taken along a line A-A' in FIG. 3.

Referring to FIG. 4, each of active pixels APX1, APX2 and APX3 may include a grid pattern 310, a transparent layer 320, a color filter 330 and a light collecting layer 340 formed over a substrate 300. The substrate 300 may include a photoelectric conversion element PD. The grid pattern 310 may be formed on the substrate 300. The transparent layer 320 may be structured to cover the grid pattern 310. The color filter 330 may be formed on the transparent layer 320. The light collecting layer 340 may be formed on the color filter 330. The light collecting layer 340 may include a semi-spherical micro lens.

The substrate 300 may include a semiconductor substrate. For example, the substrate 300 may include a monocrystalline silicon substrate.

Examples of the photoelectric conversion element PD may include organic or inorganic photodiodes, phototransistors, photogates, a combination thereof.

The grid pattern 310 may prevent an optical crosstalk between adjacent active pixels APX. The grid pattern 310 may be formed along a boundary of the photoelectric conversion element PD. The active pixels APX may be arranged in an array so that the grid pattern 310 may have a mesh shape when viewed from above.

The transparent layer 320 may have a flat upper surface to allow an optical signal to pass through the light collecting layer 340 and the color filter 330 to the photoelectric conversion element PD.

The color filter 330 may transmit the optical signal at a certain wavelength range.

The color filter 330 may include at least one of a red color filter for "red" wavelength region, a green color filter for "green" wavelength region, and a blue color filter for "blue" wavelength region.

In some example embodiments of the disclosed technology, the color filter 330 may include at least one of a cyan color filter, a yellow color filter and a magenta color filter.

Although not depicted in the drawings, an anti-reflective layer may be formed between the light collecting layer 340 and the color filter 330, or between the color filter 330 and the transparent layer 320 to increase an amount of light transmitted to the photoelectric conversion element PD.

The photoelectric conversion element PD may output an electric signal in response to incident light. For example, the photoelectric conversion element PD may generate electric charge or current based on intensity of light or quantity of light rays of the optical signal. An output value (active signal of the active pixel APX) may be determined based on an amount of electric charge or current generated by the photoelectric conversion element PD.

As shown in FIG. 4, in some implementations, the unit active pixel APX may include one photoelectric conversion element PD. In other implementations, the unit active pixel APX may include a plurality of the photoelectric conversion elements.

Figure 5:
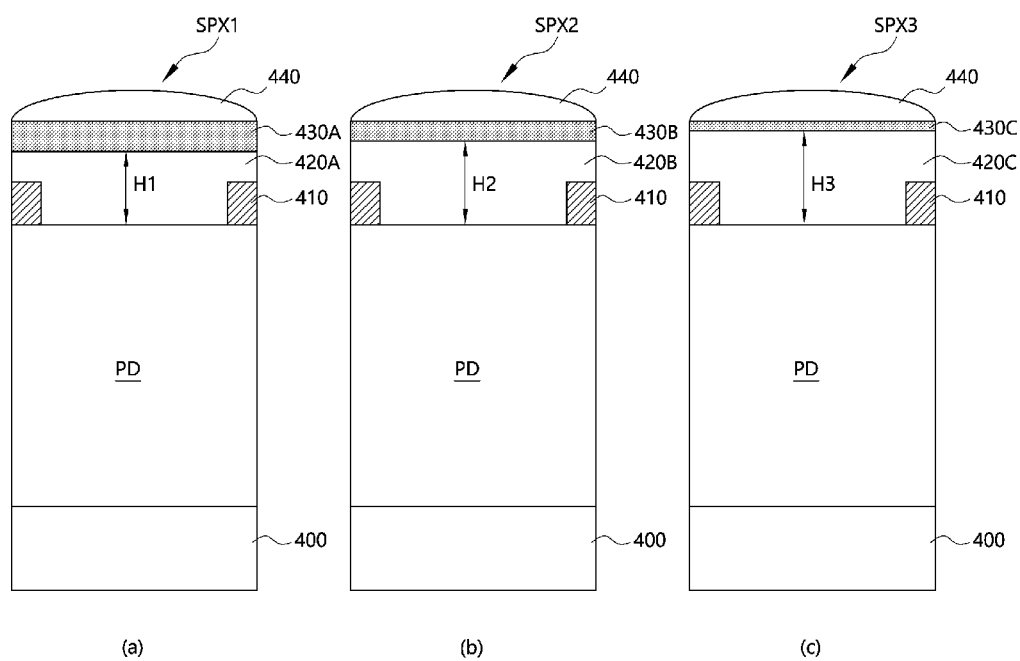
FIG. 5 illustrates a sample pixel based on example embodiments of the disclosed technology.

FIG. 5 illustrates a sample pixel based on example embodiments.

FIG. 5 shows a first sample pixel SPX1 (a) in the first sample pixel group G1, a second sample pixel SPX2 (b) in the second sample pixel group G2, and a third sample pixel SPX3 (c) in the third sample pixel group G3.

Each of the sample pixels SPX1, SPX2 and SPX3 may include a substrate 400, a grid pattern 410, heat dissipation layers 420A, 420B and 420C, color filters 430A, 430B and 430C and a light collecting layer 440. The substrate 400 may include a photoelectric conversion element PD. The grid pattern 410 may be formed on the substrate 400. The heat dissipation layers 420A, 420B and 420C may be structured to cover the grid pattern 410. The color filters 430A, 430B and 430C may be formed on the heat dissipation layers 420A, 420B and 420C. The light collecting layer 440 may be formed on the color filters 430A, 430B and 430C. The light collecting layer 440 may include a semi-spherical micro lens.

The heat dissipation layers 420A, 420B and 420C of different sample pixels SPX1, SPX2 and SPX3 in different sample pixel groups G1, G2 and G3 may have different heights H1, H2 and H3 from the photoelectric conversion element PD. The heat dissipation layers 420A, 420B and 420C may include a material having a low thermal conductivity, for example, an insulating layer such as a SiO2 layer. In some implementations, the heat dissipation layers 420A, 420B and 420C may include a low thermal conductivity material. In some implementations, the heat dissipation layers 420A, 420B and 420C may include an air gap.

In some implementations, each of the heat dissipation layers 420A, 420B and 420C has a low thermal conductivity, resulting in a low amount of heat dissipation, and the amount of heat dissipation decreases in proportion to the increase in the heights H1, H2 and H3 of the heat dissipation layers 420A, 420B and 420C. Further, when the first to third sample pixels SPX1, SPX2 and SPX3 zo operate at the same temperature, the amount of heat dissipation is the lowest at the highest heat dissipation layer.

The sample pixels SPX1, SPX2 and SPX3 may be manufactured together with the active pixel APX until the grid pattern 410 may be formed. The height difference caused by the different heights of heat dissipation layers 420A, 420B and 420C may be overcome by controlling thicknesses of the color filters 430A, 430B and 430C.

As shown in FIG. 5, in some implementations, the heat dissipation layers 420A, 420B and 420C may be disposed under the color filters 430A, 430B and 430C. In other implementations, the heat dissipation layers 420A, 420B and 420C may be positioned over the color filters 430A, 430B and 430C.

In order to operate at least one of the sample pixel groups as the sample light-shielded pixel and at least one of the sample pixel groups as the sample active pixel, the color filters 430A, 430B and 430C of the sample light-shielded pixel may include a shielding material and the color filters 430A, 430B and 430C of the sample active pixel may include a light transmission material.

In some example embodiments of the disclosed technology, the sample light-shielded pixel may be formed in the optical black region 117B and/or the dummy region 117C in FIG. 3. The sample active pixel may be formed in the active region 117A in FIG. 3.

Referring again to FIG. 2, the temperature sensor 113 coupled to the sample pixel array 111 may include a plurality of temperature sensors 1131, 1132, . . . , 113N. In some implementations, the temperature sensors 1131, 1132, . . . , 113N may include a bipolar junction transistor (BJT) based temperature sensor.

As shown in FIG. 5, for example, the sample pixel groups G1, G2, . . . , GN may have the different heat dissipation characteristics. Each of the sample pixel groups G1, G2, . . . , GN may include a sample light-shielded pixel and a sample active pixel.

The test apparatus 130 may include the test pattern generator 131 and the correction data generator 133.

During the test, the test pattern generator 131 may apply a single temperature signal TT to the sample pixel array 111 to heat the sample pixel array 111. The temperature sensors 1131, 1132, . . . , 113N may sense operating temperatures of the sample pixel groups G1, G2, . . . , GN. In some implementations, the operating temperatures can be detected on a sample pixel group basis. Because the sample pixel groups G1, G2, . . . , GN may have the different heat dissipation characteristics, the sample pixel groups G1, G2, . . . , GN may exhibit different operating temperatures in response to the same temperature signal TT. Thus, the temperature detection signals corresponding to the sample pixel groups G1, G2, . . . , GN outputted from the temperature sensors 1131, 1132, . . . , 113N may be different from each other.

The correction data generator 133 may include the temperature detector 1331, the dark level correction value determining circuit 1333 and the pedestal correction coefficient determining circuit 1335.

The temperature detector 1131 may receive the temperature detection signals DT1, DT2 and DT3 from the temperature sensors 1131, 1132, . . . , 113N to detect temperature information associated with the sample pixel groups G1, G2, . . . , GN, respectively. In some implementations, the temperature information may include the operating temperature of the sample pixel groups and the temperature in the sample pixel groups.

The sample active pixel of each of the groups may be blocked from the light during the test. The dark level correction value determining circuit 1333 may receive the temperature detection signal by the sample pixel groups G1, G2, . . . , GN, the optical black signal from the sample light-shielded pixel, and the active black signal from the sample active pixel as the test response signal. The dark level correction value determining circuit 1333 may determine the dark level correction value for correcting the dark current of the sample active pixel for each temperature range (e.g., operating temperature, temperature in the sample pixel groups) by the sample pixel groups G1, G2, . . . , GN.

In some implementations, in order to prevent a dark-level-corrected output signal of the image sensor 110 from a minus value, a specific level of an offset may be added to the dark level correction value. The offset for compensating the dark level correction value may be a pedestal. The pedestal correction may prevent the clipping of the image signal.

The pedestal correction coefficient determining circuit 1335 may determine the pedestal correction coefficient to be added to the dark level correction value by the operating temperatures.

The dark level correction value of the temperatures for each of the sample pixel groups and the pedestal correction coefficient may be obtained by performing a computation. A dark level correction value and a pedestal correction coefficient at temperature ranges outside the detected temperature ranges may be predicted.

In some example embodiments of the disclosed technology, the pedestal correction coefficient determining circuit 1335 may calculate a ratio of the active black signal with respect to the optical black signal for each of the sample pixel groups or by the operating temperatures or the temperatures in the pixels as the pedestal correction coefficient. The dark level correction value for each temperature range of the sample pixel groups and the pedestal correction coefficient may be calculated during the test. The dark level correction value and the pedestal correction coefficient corresponding to temperature ranges outside the detected temperature ranges may be predicted based on a specific calculation formula based on the calculated dark level correction value and the calculated pedestal correction coefficient.

The dark level correction value by the operating temperatures determined or predicted by the dark level correction value determining circuit 1333 and the pedestal correction coefficient by the operating temperatures calculated or predicted by the pedestal correction coefficient determining circuit 1335 may be maintained in a lookup table. The lookup table may then be stored in the image sensing device. The disclosed technology can be implemented in some embodiments to provide a processor including hardware and/or software to perform a computation using a mathematical formula for obtaining the dark level correction value on a temperature by temperature basis and the pedestal correction coefficient.

In some implementations, when the characteristics of the image sensor may be tested on an operating temperature basis, a plurality number of different tests may be performed at various test temperatures. This process of conducting different tests for various different test temperatures takes time and can be undesirable.

In recognition of the limitations of the above multi-testing process, the disclosed technology can be implemented to include, in the sample pixel array, different pixel groups having different heat dissipation characteristics and exhibiting different operating temperatures at a single test temperature. Accordingly, a single test at one test temperature can be used to measure different characteristics of different pixels by implementing the disclosed technology, thus shortening testing process and improving the test efficiency.

Figure 6:
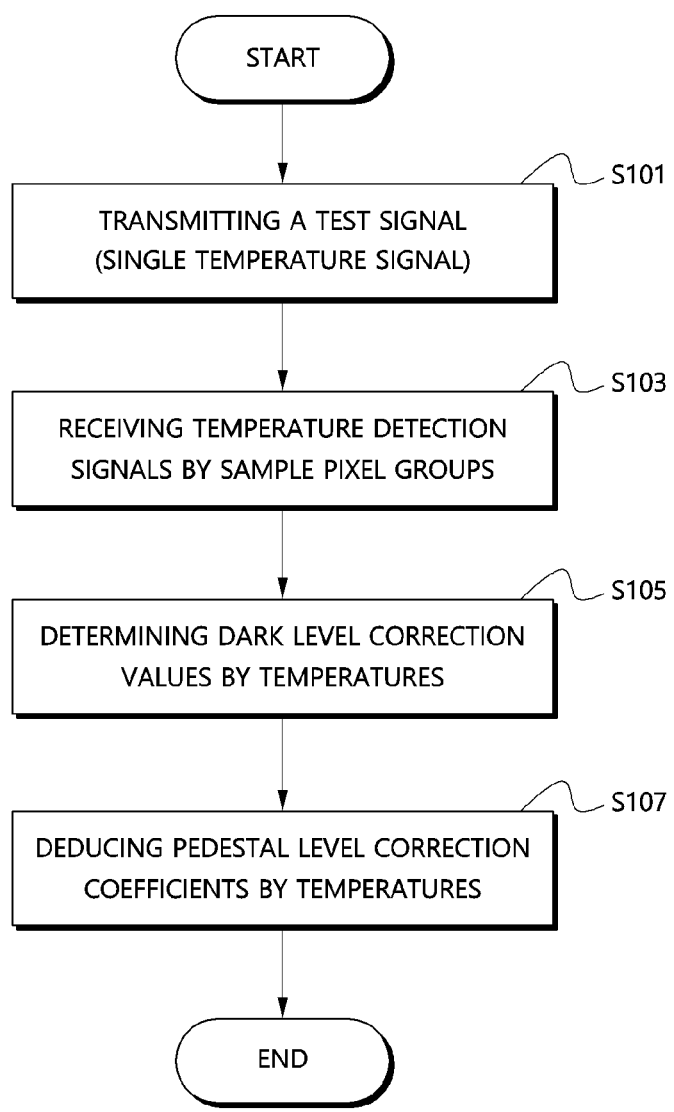
FIG. 6 is a flowchart illustrating an image sensor test method based on example embodiments of the disclosed technology.

FIG. 6 is a flow chart illustrating an image sensor test method based on example embodiments of the disclosed technology.

Referring to FIG. 6, at S101, the test apparatus 130 may apply the single temperature signal TT to the sample pixel array 111. At S103, the temperature sensors 1131, 1132, . . . , 113N may transmit the temperature detection signals by the sample pixel groups G1, G2, . . . , GN to the test apparatus 130.

The sample active pixel in the sample pixel groups G1, G2, . . . , GN may be shielded from light during the test operation. At S105, the test apparatus 130 may receive the temperature detection signals corresponding to the sample pixel groups G1, G2, . . . , GN, the optical black signal from the sample light-shielded pixel and the active black signal from the sample active pixel to determine the dark level correction value. In some example embodiments of the disclosed technology, the dark level correction values by the operating temperatures of the sample pixel group may be calculated. The dark level correction value at the non-measured temperature may be predicted based on the calculated the dark level correction value.

At S107, the test apparatus 130 may determine the correction coefficients of the pedestal by the operating temperatures added when a difference between the active black signal of the sample pixel and the level of the optical black signal may be compensated. In example embodiments, the pedestal correction coefficient by the operating temperatures of the sample pixel groups may be calculated. The pedestal correction coefficient at the non-measured temperature may be predicted based on the calculated pedestal correction coefficient.

The pedestal correction coefficient may be determined based on the ratio of the active black signal with respect to the optical black signal for the operating temperatures of the sample pixel. At S105 and S107, the determined and/or predicted dark level correction value for the operating temperatures the pedestal correction coefficient may be maintained in the lookup table. The disclosed technology can be implemented in some embodiments to provide the determined and/or predicted dark level correction value for each of the operating temperatures and the pedestal correction coefficient. The disclosed technology can be implemented in some embodiments to provide the processor including hardware and/or software compute the mathematical formula for obtaining the dark level correction value for each of the temperature ranges and the pedestal correction coefficient.

Figure 7:
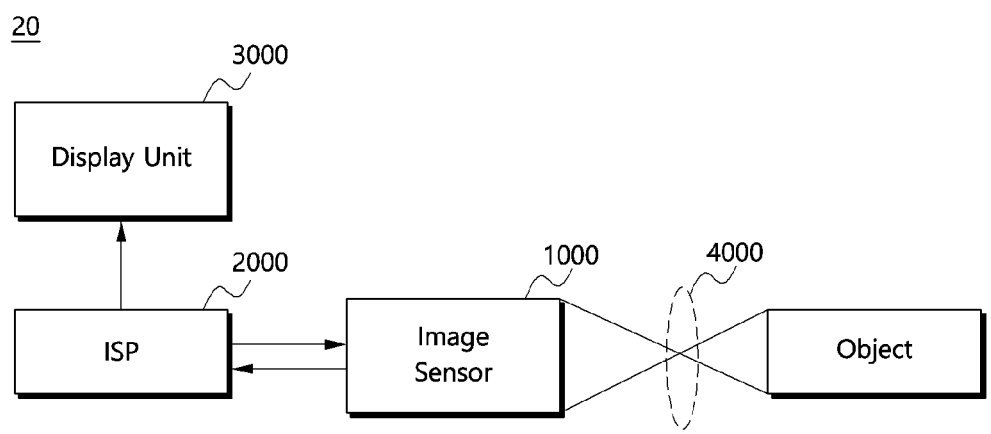
FIG. 7 illustrates an electronic device based on example embodiments of the disclosed technology.

FIG. 7 illustrates an electronic device based on example embodiments of the disclosed technology.

Referring to FIG. 7, an electronic device 20 may include an image sensor 1000, an image signal processor (ISP) 2000 and a display unit 3000. The electronic device 20 may include a digital camera, a portable electronic device with a digital camera, for example, a cellular phone, a smart phone, a tablet person computer, etc. An image signal processor (ISP) is a type of processor used for image processing to improve the quality of images captured by the image sensor and may perform image processing operations such as a color correction, a noise removal and others.

The image sensor 1000 may include a CMOS image sensor. The image sensor 1000 may sense an object based on a light incident through a lens 4000 by controls of the image signal processor 2000. The image sensor 1000 may output generated image data to the image signal processor 2000. The image signal processor 2000 may digitalize the image signal outputted from the image sensor 1000. The image signal processor 2000 may transmit the digital image signal to the display 3000.

The image sensor 1000 and the image signal processor 2000 may include a printed circuit board (PCB) such as a motherboard, an integrated circuit (IC), a system on chip (SoC), etc. In example embodiments, the image sensor 1000 and the image signal processor 2000 may be embodied as one package, for example, a multi-chip package (MIP), a system in package (SiP), etc. The image sensor 1000 may include a separated chip, for example, a CMOS image sensor chip.

The correction data may be determined (extracted) by the test system and the method illustrated with reference to FIGS. 1 to 6 in manufacturing the image sensor 1000. The processor configured to calculate the determined correction data or the correction data may be stored in a storage of the image signal processor 2000 to reflect the object as the digital signal.

Figure 8:
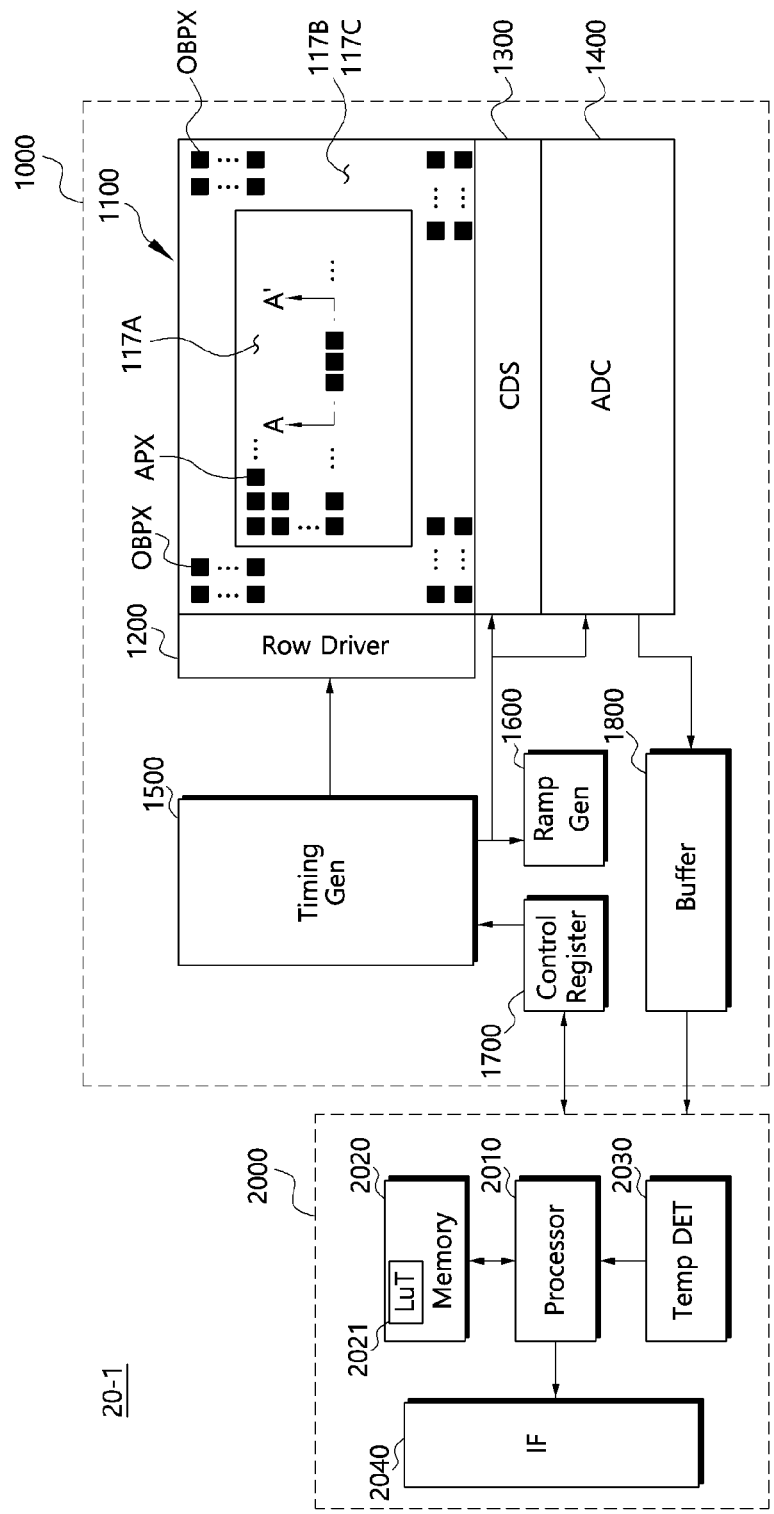
FIG. 8 illustrates an electronic device based on example embodiments of the disclosed technology.

FIG. 8 illustrates an electronic device based on example embodiments of the disclosed technology.

Referring to FIG. 8, an electronic device 20-1 may include an image sensor 1000 and an ISP 2000.

The image sensor 1000 may include a pixel array 1100, a row driver 1200, a correlated double sampler (CDS) 1300, an analog-digital converter (ADC) 1400, a timing generator 1500, a ramp signal generator 1600, a control register 1700 and a buffer 1800.

The pixel array 1100 may include an active pixel region 117A, an optical black pixel region 117B and a dummy region 117C. The plurality of active pixel APX may be formed in the active pixel region 117A. The optical black pixel OBPX may be formed in the optical black pixel region 117B.

A selected active pixel APX of the plurality of active pixels APX may be connected to any one of row lines (not shown) and any one of column lines (not shown). The selected active pixel APX may generate the active signal corresponding to the wavelengths of the light. For example, each of the active pixels APX may convert the optical image information into the electrical image signal to output the electrical image signal to the CDS 1300 through the column lines. The active pixels APX may include an optical detection element, for example, a photo diode, a pinned photo diode, a photo gate, etc.

Each of the active pixels APX may have the structure in FIG. 4, not restricted within a specific structure.

The optical black pixels OBPX in the optical black pixel region 117B may shield the incident light to generate the optical black signal having the dark level. Each of the optical black pixels OBPX may include the optical detection element.

In example embodiments, the pixel array 1100 may include the sample pixel array, the temperature sensor 113 and the temperature detector 1331 in FIGS. 1, 2B and 5.

The control register 1700 may generate at least one control signal for controlling operations of the timing generator 1500, the ramp signal generator 1600 and the buffer 1800.

The row driver 1200 may drive the pixel array 1100 by a row unit. That is, the row driver 1200 may generate a row selection signal for selecting any one of the rows in the pixel array 1100.

Each of the active pixels APX may sense the incident light to output the active signal to the CDS 1300. Each of the optical black pixels OBPX may output the optical black signal to the CDS 1300.

The CDS 1300 may perform correlated double sampling with respect to the received active signal and the optical black signal.

In example embodiments, the CDS 1300 may hold and sample a reference voltage level and a voltage level of the received electrical image signal according to a provided clock signal. The CDS 1300 may then transmit an analog signal corresponding to a difference between the reference voltage level and the voltage level of the electrical image signal to the ADC 1400.

The ADC 1400 may compare a ramp signal generated from the ramp signal generator 1600 with a correlated double sampled signal outputted from the CDS 1300 to output a plurality of comparison signals. The ADC 1400 may transmit count values of transition times of the comparison signals in response to a clock signal to the buffer 1800.

The buffer 1800 may temporarily store the count value, i.e., the digital active signals outputted from the ADC 1400.

The buffer 1800 may sense, amplify and output the digital active signals. The digital active signals inputted into the buffer 1800 may include the dark current caused by the photoelectric conversion element PD.

The ISP 2000 may reflect the dark level correction value and the pedestal correction coefficient on the digital image signal transmitted from the buffer 1800 of the image sensor 1000 to control the offset.

The ISP 2000 may include a processor 2010, a memory 2020, a temperature detector 2030 and an interface circuit 2040.

The processor 2010 may be configured to control whole operations of the ISP 2000.

The memory 2020 may include any type of One-time programmable (OTP) memory.

The temperature detector 2030 may detect the operating temperature of the image sensor 1000 to determine the dark level correction value and the pedestal correction coefficient by the temperatures. The temperature detector 2030 may be located outside the ISP 2000.

The interface circuit 2040 may provide a communication environment between the electronic device 20-1 and an external device.

In example embodiments, the correction data determined by the test system 10 discussed above with reference to FIGS. 1 to 6, for example, the dark level correction value may be stored in the memory 2020 in the lookup table (LuT) 2021 for each of the temperature ranges and the pedestal correction coefficient.

The processor 2010 may detect the operating temperature of the image sensor 1000 based on the temperature detection signals received from the temperature detector 2030. The processor 2010 may calculate the correction data including the dark level correction value and the pedestal correction coefficient on a temperature range basis based on the lookup table 2021. The processor 2010 may reflect the calculated correction data on the digital image signal outputted from the image sensor 1000 to control the offset. The processor 201 may then output the controlled offset the external device, for example, the display through the interface circuit 2040.

The processor 2010 may use the correction data formula for each of the operating temperatures determined by the test system 10 discussed with reference to FIGS. 1 to 6. The processor 2010 may recognize the operating temperature of the image sensor 1000 based on the temperature detection signals received from the temperature detector 2030. The processor 2010 may use the calculation formula to obtain the correction data including the dark level correction value and the pedestal correction coefficient corresponding to the present temperature. The processor 2010 may reflect the calculated correction data on the digital image signal outputted from the image sensor 1000 to adjust the offset. The processor 2010 may then output the adjusted offset to the external device through the interface circuit 2040.

In example embodiments, when the pixel array 1100 may include the sample pixel array and the temperature sensor 113 in FIGS. 1, 2B and 5, the processor 2010 may include the dark level correction value determining circuit 1333 and the pedestal correction coefficient determining circuit 1335 to determine the correction data based on the temperatures on a sample pixel group basis. In some implementations, when the pixel array 1100 includes the temperature detector 1331, the temperature detector 2030 in the ISP 2000 may be omitted.

Figure 9:
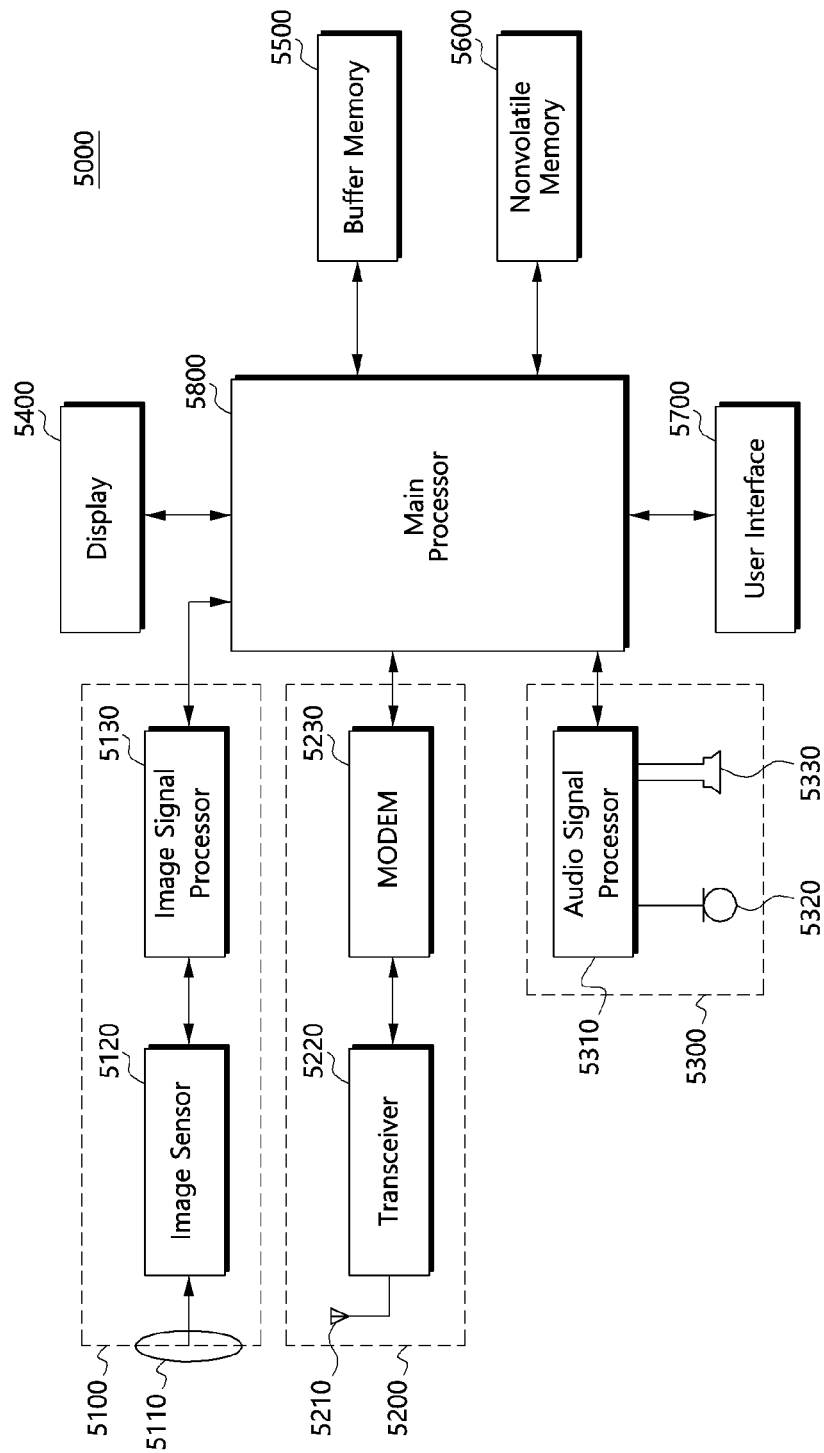
FIG. 9 illustrates an electronic device based on example embodiments of the disclosed technology.

FIG. 9 illustrates an electronic device based on example embodiments of the disclosed technology.

Referring to FIG. 9, an electronic device 5000 may include an image processor 5100, a communication device 5200, an audio processor 5300, a display device 5400, a buffer memory 5500, a non-volatile memory 5600, a user interface 5700 and a main processor 5800.

The image processor 5100 may receive an optical signal through a lens 5110. An image sensor 5120 and an image signal processor 5130 in the image processor 5100 may generate image data representing an object based on the received optical signal. For example, the image sensor 5120 and the image signal processor 5130 may have functions that are identical or similar to those of the image sensor and the image signal processor in FIGS. 7 and 8.

The communication device 5200 may exchange signals with an external device through an antenna 5210. A transmitter/receiver 5220 and a MODEM 5230 in the communication device 5200 may process the signal exchanged with the external device based on various wireless communication protocols or rules.

The audio processor 5300 may process an audio signal using an audio signal processor 5310. The audio processor 5300 may receive the audio signal through a microphone 5320 to digitally process the audio signal. The audio processor 5300 may regenerate the audio signal to output the regenerated audio signal through a speaker 5330.

The display device 5400 may receive data from the external device such as the main processor 5800. The display device 5400 may display an image through a display panel based on the received data.

The buffer memory 5500 may store data used for operations of the electronic device 5000. The buffer memory 5500 may temporarily store data processed or to be processed by the main processor 5800. For example, the buffer memory 5500 may include a volatile memory such as a static random access memory (SRAM), a dynamic RAM (DRAM), a synchronous DRAM (SDRAM), etc., a non-volatile memory such as a phase-change RAM (PRAM), a magneto-resistive RAM (MRAM), a resistive RAM (ReRAM), a Ferro-electric RAM (FRAM), etc.

The non-volatile memory 5600 may store data regardless of a supplying of a power. The non-volatile memory 5600 may include at least one of a flash memory, a PRAM, an MRAM, a ReRAM, an FRAM, etc. The non-volatile memory 5600 may include a detachable memory such as a secure digital (SD) card and/or an embedded memory such as an embedded multimedia card (eMMC).

The user interface 5700 may provide an interface to the communications between the user and the electronic device 5000. For example, the user interface 5700 may include an input interface such as a keypad, a button, a touch screen, a touch pad, a gyroscope, a vibration sensor, an acceleration sensor, etc. The user interface 5700 may include an output interface such as a monitor, an LED lamp, etc.

The main processor 5800 may control the whole operations of the electronic device 5000. The main processor 5800 may perform computations to operate the electronic device 5000. For example, the main processor 5800 may include at least one processor core such as a general-purpose processor, a special-purpose processor, an application processor, and a microprocessor.

Only limited examples of implementations or embodiments of the disclosed technology are described or illustrated. Variations and enhancements for the disclosed implementations or other embodiments are possible based on what is disclosed and illustrated in this patent document.

What is claimed is:

1. An image sensor comprising:
an active pixel array including a plurality of active pixels operable to convert incident light into pixel signals carrying image information in the incident light;
a plurality of sample pixel groups located adjacent to but spatially separate from the active pixel array, and having different heat dissipation characteristics from other sample pixel groups; and
a plurality of temperature sensors coupled to the sample pixel groups, respectively, to provide temperature measurements, and
wherein each of the sample pixel groups comprises:
a substrate supporting a plurality of photoelectric conversion elements formed in the substrate;
a grid pattern formed on the substrate along a boundary between adjacent photoelectric conversion elements;
a heat dissipation layer formed on the grid pattern;
a color filter formed on the heat dissipation layer; and
a light collecting layer formed on the color filter,
wherein heights of the sample pixel groups associated with the heat dissipation layer are same, and heat dissipation layers of different sample pixel groups have different heights.

2. The image sensor of claim 1, wherein each of the sample pixel groups comprises an optical black pixel structured to generate a dark current by blocking light from entering the optical black pixel and an active pixel structured to convert incident light into pixel signals.

3. The image sensor of claim 1, wherein the heat dissipation layer comprises an insulation layer.

4. The image sensor of claim 3, wherein the insulation layer includes $SiO_2$.

5. The image sensor of claim 1, wherein the heat dissipation layer comprises a low thermal conductivity material.

6. The image sensor of claim 5, wherein the low thermal conductivity material includes an air gap.

7. An image sensor test system comprising:
an image sensor including a plurality of sample pixel groups having different heat dissipation characteristics from other sample pixel groups, and a plurality of temperature sensors coupled to the sample pixel groups, respectively, to generate temperature detection signals;
a temperature detector configured to receive the temperature detection signals corresponding to the sample pixel groups, respectively, from the temperature sensors to determine operating temperature information associated with the sample pixel groups; and
a test apparatus configured to receive dark currents from the sample pixel groups to determine correction data to be used to correct the dark currents, the correction data including a dark level correction value for each temperature range and a pedestal correction coefficient,
wherein each of the sample pixel groups comprises:
a substrate supporting a plurality of photoelectric conversion elements formed in the substrate;
a grid pattern formed on the substrate along a boundary between adjacent photoelectric conversion elements;
a heat dissipation layer formed on the grid pattern;
a color filter formed on the heat dissipation layer; and
a light collecting layer formed on the color filter,
wherein heights of the sample pixel groups associated with the heat dissipation layer are same, and heat dissipation layers of different sample pixel groups have different heights.

8. The image sensor test system of claim 7, wherein the test apparatus comprises a test pattern generator configured to transmit a single temperature signal to the image sensor to increase a temperature in the image sensor.

9. The image sensor test system of claim 7, wherein the temperature detector is incorporated into the image sensor or the test apparatus.

10. The image sensor test system of claim 7, wherein each of the sample pixel groups comprises an optical black pixel and an active pixel, and the test apparatus determines the correction data for each temperature range based on an optical black signal of the optical black pixel and an active black signal of the active pixel.

11. The image sensor test system of claim 7, wherein the heat dissipation layer comprises an insulation layer including $SiO_2$.

12. The image sensor test system of claim 7, wherein the heat dissipation layer comprises an air gap.

13. An image sensor test method, comprising:
providing an image sensor including a plurality of sample pixel groups having different heat dissipation characteristics, and a plurality of temperature sensor coupled to the sample pixel groups, respectively;
providing a test apparatus to receive operating temperature information including temperatures in the sample pixel groups in a test apparatus;
receiving dark currents from the sample pixel groups; and
determining correction data to be used to correct the dark currents, wherein the correction data includes a dark level correction value for each temperature range and a pedestal correction coefficient,
wherein each of the sample pixel groups comprises:
a substrate supporting a plurality of photoelectric conversion elements formed in the substrate;
a grid pattern formed on the substrate along a boundary between adjacent photoelectric conversion elements;
a heat dissipation layer formed on the grid pattern;
a color filter formed on the heat dissipation layer; and
a light collecting layer formed on the color filter,
wherein heights of the sample pixel groups associated with the heat dissipation layer are same, and heat dissipation layers of different sample pixel groups have different heights.

14. The image sensor test method of claim 13, wherein each of the sample pixel groups comprises an optical black pixel and an active pixel, and wherein receiving the dark current comprises receiving an optical black signal of the optical black pixel and an active black signal of the active pixel.

15. The image sensor test method of claim 13, wherein the test apparatus transmits a single temperature signal to the image sensor to increase s temperature in the image sensor.

16. The image sensor test method of claim 13, wherein receiving the operating temperature information further comprises:
receiving, by a temperature detector that is disposed inside or outside the image sensor, a temperature detection signal from the temperature sensor to detect an operating temperature of the image sensor; and
transmitting, by the temperature detector, the operating temperature information to the test apparatus.

* * * * *